United States Patent [19]

Capkun et al.

[11] Patent Number: 5,103,464
[45] Date of Patent: Apr. 7, 1992

[54] METHOD AND APPARATUS FOR TIMING RECOVERY IN DIGITAL DATA COMMUNICATIONS SYSTEMS

[75] Inventors: Edward A. Capkun; Ephraim Arnon, both of Ottawa, Canada

[73] Assignee: Northern Telecom Limited, Montreal, Canada

[21] Appl. No.: 531,446

[22] Filed: May 31, 1990

[51] Int. Cl.⁵ .............................................. H04L 7/00
[52] U.S. Cl. ................................. 375/106; 370/105.5
[58] Field of Search ............... 375/12, 14, 106, 101, 375/110, 118, 119; 328/72, 75, 151, 155, 162; 358/138; 307/352, 353, 511, 518, 105.5; 370/105.5

[56] References Cited

U.S. PATENT DOCUMENTS

| 4,438,523 | 3/1984 | Brandl | 375/30 |
|---|---|---|---|
| 4,464,768 | 8/1984 | Lewis et al. | 328/165 |
| 4,627,080 | 12/1986 | Debus, Jr. | 375/110 |
| 4,675,880 | 6/1987 | Davarian | 375/101 |
| 4,682,327 | 7/1987 | Okumura et al. | 370/100 |
| 4,959,845 | 9/1990 | Tol et al. | 375/106 |

FOREIGN PATENT DOCUMENTS

| 1242502 | 9/1927 | Canada | 350/73 |
|---|---|---|---|
| 0330282 | 2/1989 | European Pat. Off. | |

OTHER PUBLICATIONS

IEEE Proceedings of the Internatoinal Symposium on Subscriber Loops and Services, Oct. 29, 1986, Tokyo (JP) pp. 250-255; K. J. Wouda et al.: 'Towards a Single Chip ISDN Transmission Unit', see p. 253, paragraph 6.
Proceedings IEEE Global Telcommunications Conference; Nov. 29, 1982, Miami (U.S.), pp. 931-935; C. A. Ehrenbard et al.: 'A Baud-Rate Line-Interface for Two-Wire High-Speed Digital Subscriber Loops.'
IEEE Journal of Solid-State Circuits, No. 6, Dec. 1989, New York (U.S.), pp. 1605-1611; O. Agazzi et al.: 'A Digital Signal Processor for ANSI Standard ISDN Transceiver', see p. 1605, col. 2, line 4-p. 1606, col. 1, line 12; see p. 1607, col. 2, line 18-p. 1608, col. 2, line 2.
Circuit Design and Transmission Performance for ISDN Basic Interface, Okumura, Yamamoto and Kuribayashi; NTT Electrical Communications Laboratories, pp. 1651-1655.
A New Phase-Locked Oscillator Adaptable to Input Signals with Periodical Phase Jumps, Okumura, Hayashi and Inoue: Proceedings of ISCAS 85, pp. 599-602.

Primary Examiner—Stephen Chin
Attorney, Agent, or Firm—Thomas Adams

[57] ABSTRACT

In apparatus for receiving digital data signals in a digital communication system, especially an Integrated Services Digital Network, timing recovery problems associated with erratic zero crossing when multiple terminals transmit to a common receiver are mitigated by detecting the rate of change of the digital data signal between two predetermined positions and controlling sampling of the digital data signal in dependence upon the difference between such rate of change and a reference. The rate of change conveniently corresponds to the trailing "corner" of a framing pulse, i.e. the point at which the signal commences the transition from one polarity to the other. The "corner" is much more stable, i.e. less susceptible to variation due to multiple terminal effects, than the zero-crossing which follows it, since the zero crossing may vary relative to the "corner". The transition may be determined by sampling the digital data signal at two discrete positions and determining when the two resulting samples differ in amplitude by a predetermined amount. One of the two pulses, namely the one with the larger amplitude, may then be used for data recovery purposes.

22 Claims, 3 Drawing Sheets

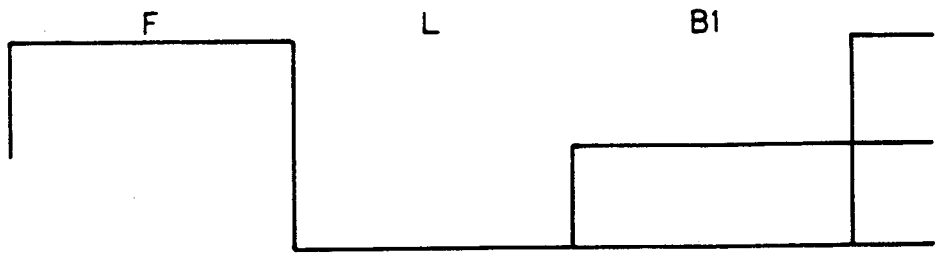
FIG. 2a
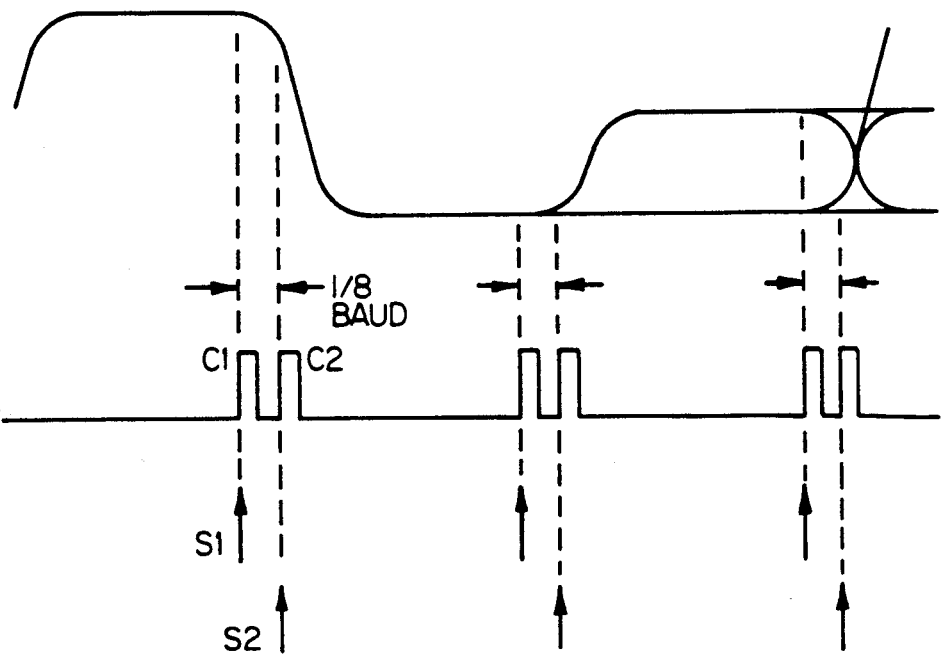
FIG. 2b
FIG. 2c
FIG. 2d
O/P OF ALU 32
FIG. 2e
| 0.8|S1|−|S2| FROM F | 0.8|S1|−|S2| FROM L |
FIG. 2f ENABLE
FIG. 2g
| 0.8|S1|−|S2| FROM F (PREVIOUS FRAME) | 0.8|S1|−|S2| FROM F (CURRENT FRAME) |

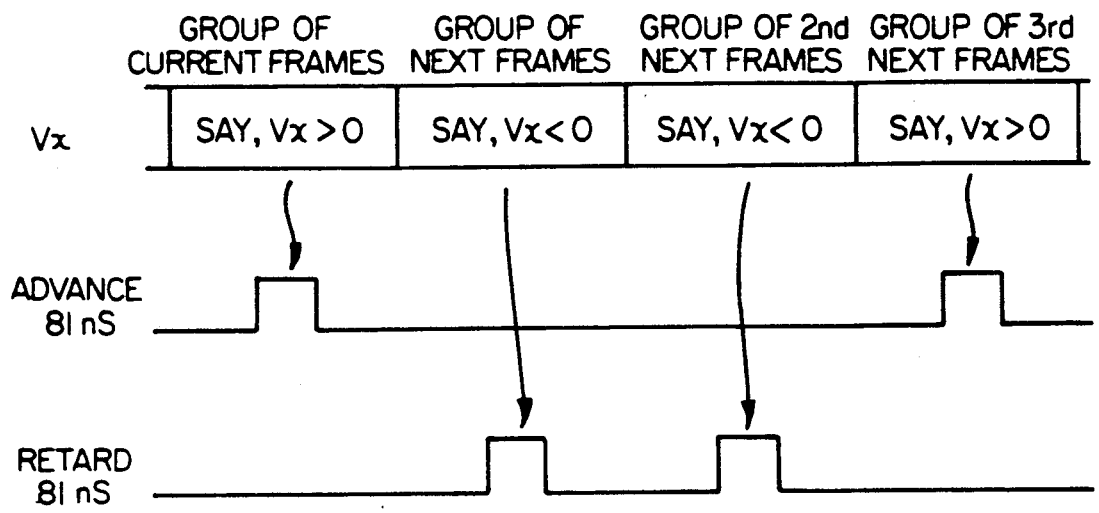
FIG. 3
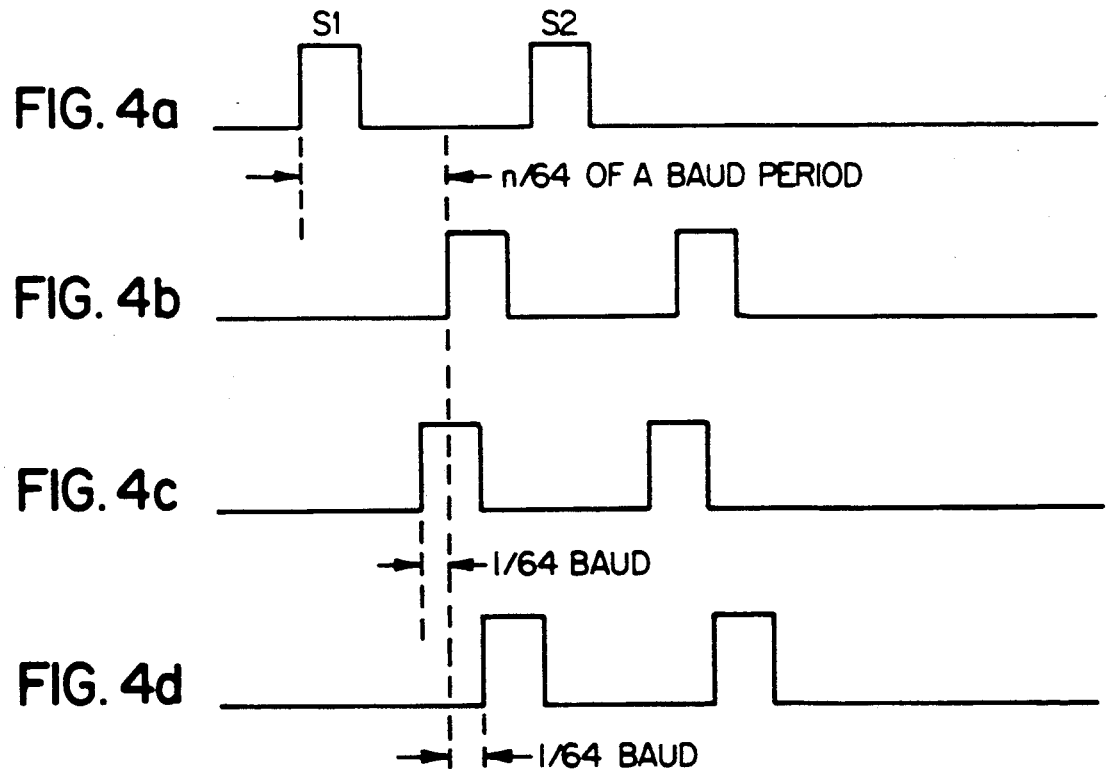

1

METHOD AND APPARATUS FOR TIMING RECOVERY IN DIGITAL DATA COMMUNICATIONS SYSTEMS

FIELD

The invention relates to an apparatus and a method for transmitting and receiving digital signals, and is especially, but not exclusively, applicable to the recovery of timing from digital signals in an Integrated Services Digital Network (ISDN). Copending U.S. patent application Ser. No. 209,629 filed June 20, 1988, and commonly assigned with this invention, relates to such ISDN networks and is incorporated herein by reference.

BACKGROUND

As discussed in the afore-mentioned patent application Ser. No. 209,629, in an Integrated Services Digital Network (ISDN), as defined in the recommendations of the International Telegraph and Telephone Consultative Committee (CCITT), and ISDN telephone subscriber loop includes a U-interface and a T-interface. The U-interface loop includes a two-wire full duplex digital signal transmission line, and extends from a telephone central office or exchange termination (ET) to a network termination (NT). The network termination couples the signals between the U-interface and the T-interface, which includes a four-wire digital signal transmission line for providing transmit and receive signal paths between the network termination (NT) and the terminal equipment (TE), usually including at least one, and as many as eight, ISDN telephone sets.

The network termination (NT) must be able to correlate the information being received on the receive signal path, from the terminal equipment (TE), with the information which it has just transmitted to the TE on the transmit signal path.

It is desirable to have a network termination timing recovery arrangement which is able to accommodate the different configurations envisaged by ISDN T-interface standards, and which will be able to extract the timing despite the different mean phases of the signals received from plural terminal equipments (TE).

Recommended configurations and operating parameters for the T-interface are defined in the CCITT Red Book, layer 1 specification I.430, published 1985, updated 1986, and American National Standard T1.XYZ.1918Y. (ANSI specification), in the latter document specifically at Section 8.6.3. These recommendations entertain provision of up to four kinds of Network Termination to support the various T-interface configurations. Those specified are for Short Passive Bus, Point-to-Point, Extended Passive Bus, and both Point-to-Point and Passive Bus. The round trip delay for Point-to-Point and Extended Passive Bus configurations ranges from 10 to 42 microseconds. For the Short Passive Bus, the round trip delay is in the range of 10 to 14 microseconds, and for the combination of Point-to-Point and Passive Bus, the round trip delay should be in the range of 10 to 13 microseconds for Passive Bus and 10–42 microseconds for Point-to-Point. In the case of the Extended Passive Bus, the differential delay between signals from different termination equipments is in the range 0 to 2 microseconds.

Each Network Terminal (NT) will synchronize its signal transmitted on the transmit path of the T-interface with the signal it is receiving on the U-interface. The difficulty lies in synchronizing the signals being received on the receive path of the T-interface because they will have been originated by different terminal equipments, and so will have different amounts of jitter and phase shift.

In a so-called fixed timing recovery system, the network termination identifies the beginning of the frame being transmitted, delays a predetermined length of time (typically less than a bit period) and then samples the incoming receive path for the corresponding receive signal. This arrangement is not entirely satisfactory, however, because it arbitrarily fixes the maximum loop length to less than the bit period.

Adaptive timing recovery systems have been disclosed in which the sampling instant is varied with respect to a predetermined reference, namely a zero-crossing, in the digital signal received from the terminal equipment. A disadvantage of such adaptive timing recovery systems is that the positions of the zero-crossings in different signals differ according to the varying distances between the network terminator and the terminal equipment.

The problem of adapting timing recovery for different configurations has been addressed by Yasuyuki Okumura, Kazuhiro Hayashi, and Yuji Inoue in a paper entitled "A New Phase Locked Oscillator Adaptable to Input Signals With Periodical Phase Jumps" Proceedings of ISCAS 85, IEEE; by Yasuyuki Okumura, Takashi Yamamoto, and Masasha Kuribayashi, in a paper entitled "Circuit Design and Transmission Performance for ISDN Basic Interface", IEEE, 1986; and by Yasuyuki Okumura and Kazuhiro Hayashi in U.S. Pat. No. 4,682,327 entitled "Polyphase Phase Lock Oscillator", issued July 21, 1987, all of which are incorporated herein by reference. They proposed an adaptive timing extraction method using a polyphase phase-locked oscillator. This oscillator comprises a phase-locked loop for each individual channel which extracts the timing clock pulse from the channel independently, following segregation of the input signals for each channel by gate signals generated using the marker from the received signal.

This arrangement is not entirely satisfactory because it presumes that each channel will be allocated to a single terminal equipment and moreover requires complex circuitry.

Canadian patent number 1,242,502 issued Sept. 9, 1988 and incorporated herein by reference, discloses an adaptive rate recovery circuit for receiving digital data. The adaptive rate recovery circuit uses two clocks to provide two alternative sampling instants spaced apart by a predetermined amount. A quadratic function relating the two timing instants is computed and the actual timing instant determined according to the sign of the quadratic function. This is not entirely satisfactory since it employs two clocks and is complicated.

The present invention seeks to ameliorate the problems associated with such known systems.

SUMMARY OF THE INVENTION

According to one aspect of the present invention, apparatus for receiving digital signals comprises timing recovery means for controlling sampling of said digital data signal. Such timing recovery means comprises means for sampling said digital signal in response to a clock signal; means for detecting, within a baud period, a rate of change of said digital signal and providing a phase error signal in dependence upon the difference between said rate of change and a reference; and means responsive to such phase error signal for controlling said clock signal to determine the timing of said sampling of said digital signal.

In preferred embodiments of the invention, the aforesaid rate of change is determined at a position corresponding to the trailing "corner" of a pulse, i.e. the point at which the signal commences the transition from one polarity to the other. In an ISDN system, the transition preferably is that between the framing bit "F" and the next bit "L".

Preferably, the means for detecting the rate of change comprises means for sampling said digital data signal at two discrete positions in a baud period and determining when the two samples differ in amplitude by a predetermined amount. One of the two pulses, namely the one with the larger amplitude, may then be used as the sample required for data recovery purposes. In effect, such determination measures the change between two points, one before and one after, at the corner of the trailing edge of the framing pulse, at the transition between the framing pulse and the next pulse.

According to a second aspect of the invention, a method of recovering timing in apparatus for receiving digital signals comprises the steps of:- sampling each baud of said digital signal in response to a clock signal;

detecting, in a baud period, a rate of change of said digital signal and providing a phase error signal which varies in dependence upon the difference between said rate of change and a reference; and in response to said phase error signal, controlling said clock signal to determine the timing of said sampling of said digital signal.

BRIEF DESCRIPTION OF DRAWINGS

FIG. 2 is a timing diagram for A/D converter, filter and phase detector portions of the timing recovery system;

FIG. 3 is a timing diagram for a phase shift control portion of the timing recovery system; and FIG. 4 is a timing diagram for a phase shifter which adjusts the sampling point of the A/D converter.

SPECIFIC DESCRIPTION OF A PREFERRED EMBODIMENT

Figure 1:
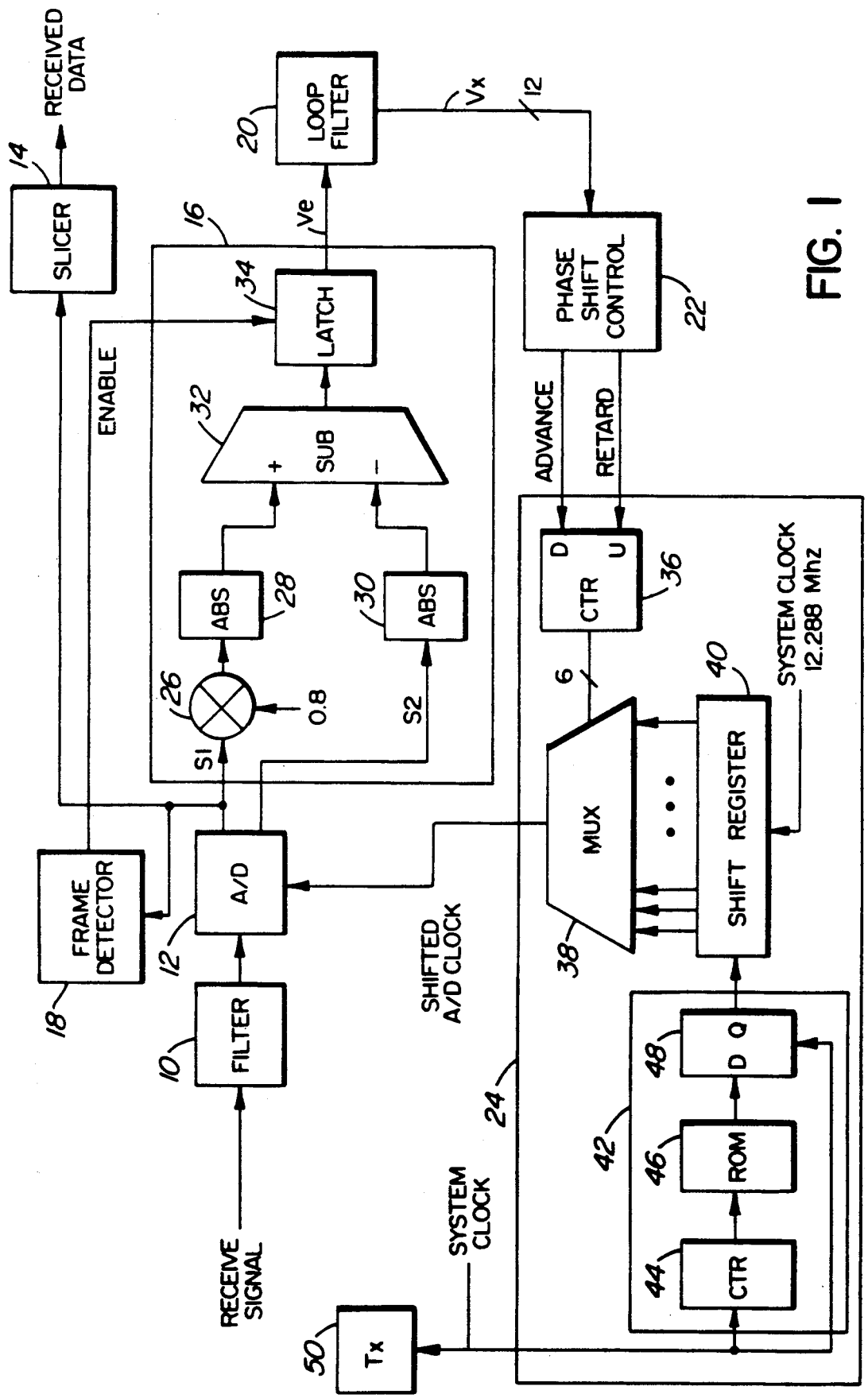
FIG. 1 is a block schematic diagram of a timing recovery portion of a receiver for an ISDN digital data transmission system.

Referring to FIG. 1, a receiver for use in an Integrated Services Digital Network (ISDN) comprises a timing recovery circuit in the form of a digital phase lock loop which is used to recover timing from a digital data signal "RECEIVE" applied to the input of the timing recovery circuit. The RECEIVE signal is framed in accordance with ISDN protocol, each frame comprising a framing bit F at the beginning of each frame. The RECEIVE signal is applied by way of a low pass filter 10 to an analogue-to-digital converter 12 which samples it twice in each baud to produce a pair of samples S1 and S2. One of the samples, S1, is applied to a slicer 14, the output of which is the recovered data.

The pairs of such samples S1 and S2 are applied to a phase detector 16 which is enabled by an enabling signal ENABLE derived from the RECEIVE signal by means of a frame detector 18. The phase detector 16 processes the pair of samples to determine deviation of the sampling instant from a predetermined optimum and produces, once in each frame, a phase error signal Ve. The phase detector 16 actually computes the phase error for each baud but only produces the phase error signal Ve once in each frame, namely in the baud period of the framing bit F.

The frame detector 18 may be any kind which detects frame before timing is recovered. For an example of suitable frame detectors, the reader is directed to aforementioned application Ser. No. 209,629. S/T transceiver MC145474 by Motorola Inc. also employs a suitable frame detector.

The phase error signal Ve is filtered by means of a loop filter 20 which removes high frequency jitter components from the phase error signal Ve to produce a phase control signal Vx. Phase shift control means 22 determines the sign of the filtered phase error control signal Vx and generates either an ADVANCE signal or a RETARD signal depending upon such sign. The ADVANCE and RETARD signals control a phase shifter means 24 to vary the phase of a "shifted A/D" clock which controls the A/D converter 12.

The low pass filter 10 comprises a second order Butterworth low pass filter with a bandwidth of 300 KHz. The A/D converter 12 may be a 12-bit linear converter of conventional construction but is clocked twice in each baud to produce the two samples S1 and S2 whereas, in a conventional timing recovery circuit, it would only be clocked once.

Referring also to FIG. 2, which shows the timing diagrams and signals associated with the low pass filter 10, A/D converter 12 and phase detector 16, FIG. 2(a) shows a portion of the RECEIVE signal comprising F, L, and B1 bits as designated in the aforementioned ISDN standards. FIG. 2(b) shows the shape of the signal after filtering by low pass filter 10. As shown in FIG. 2(c), the shifted A/D clock which controls A/D converter 12 comprises a pair of clock pulses C1 and C2 spaced apart by one eighth of a baud period. The clock pulses C1 and C2 are so positioned that, when the correct phase has been found, the A/D converter 12 samples the RECEIVE signal at two positions straddling the trailing corner of the F bit to produce the pair of samples S1 and S2, respectively. The two samples S1 and S2 are generated every baud period, as shown in FIG. 2(d), but only the samples for the framing bit F are used by the timing recovery circuit.

Optimum sampling of the received signal is obtained when the data recovery sampling pulse, in this case the first pulse S1, is substantially centered in the available window. In a Short Passive bus configuration this optimum sampling has been shown to obtain when the sample S2 is 80 percent of the sample S1. The phase error signal Ve, derived as 0.80 |S1|−|S2|, will be zero when the sampling phase is optimized and the two samples S1 and S2 straddle the trailing corner of the framing bit F as shown in FIG. 2(b).

Referring again to FIG. 1, and the associated timing diagrams in FIGS. 2(e), 2(f) and 2(g), the phase detector 16 comprises a multiplier 26 which multiplies the first sample S1 by a factor of 0.8 and applies it to an absolute value (ABS) circuit 28. The second sample S2 is applied directly to a second ABS circuit 30. The output of the ABS circuit 30 is subtracted from the output of ABS circuit 28 by means of an arithmetic logic circuit (ALU) 32. The difference signal, given at the output of the ALU 32, is latched by means of latch 34 which is operated by the ENABLE signal from frame detector 18 coincident with the framing pulse F.

The output of the latch 34 {FIG. 2(g)}, which comprises the phase error signal Ve, is filtered by loop filter 20, to produce the filtered phase error signal Vx. The loop filter 20 may be of the "integrated-and-dump" kind and add the phase error signal Ve over several frames before modifying the value of its output, the filtered phase error signal Vx.

The phase shift control means 22 comprises a digital comparator which compares the filtered phase error signal Vx with zero. If Vx is greater than zero, phase shift control means 22 generates a single pulse (ADVANCE), as shown in FIG. 3, to advance the timing instant by 81 nanoseconds, which is the equivalent of 1/64th of a baud period. If the filtered phase shift control signal Vx is less than zero, the phase shift control means 22 produces a single pulse (RETARD) to retard the timing instant by 81 nanoseconds.

In the phase shifter 24, these ADVANCE and RETARD pulses are applied to the count down (DOWN) and count up (UP) control inputs, respectively, of a six-bit UP/DOWN counter 36. The output of the counter 36 controls a 1-of-64 multiplexer 38, the output of which is the shifted A/D clock applied to the A/D converter 12. The sixty-four inputs of the multiplexer 38 are connected to the parallel outputs of a shift register 40 which is clocked 64 times per baud by the system clock.

In the clock-doubler circuit 42, the system clock of 12.288 Mhz. (64 cycles per baud for 192 KHz transmission rate) is applied to a divide-by-64 counter 44. The 6-bit output of the divide-by-64 counter 44 is used to address a 64-by-1 read-only memory (ROM) 46. The ROM 46 contains two 1's at positions corresponding to the positions of the two samples S1 and S2 in the baud period. In the specific embodiment, one bit is at address location 55 and the second bit is at address location 63. The remaining sixty-two locations are occupied by zeros. A flip-flop 48 clocked by the system clock latches the output of the ROM 46 and applies it to the serial input of shift register 40.

As the ROM 46 is addressed sequentially by the output of counter 44, the bit stream leaving the ROM 46 will be a series of zeros with the ones interposed at the timing intervals corresponding to S1 and S2 samples. This sequence of bits is the A/D clock signal {see FIG. 4(a)}, which is clocked into the shift register 40 under the control of the system clock of 12.288 MHz. As the A/D clock with its two bits occurring at prescribed intervals is clocked through the shift register 40, the bits are presented in parallel to the multiplexer 38 and from the multiplexer 38, as the shifted A/D clock signal, to the A-to-D converter 12.

FIG. 4 illustrates several different phases of the shifted A/D clock signal depending upon whether it is advanced or retarded. In FIG. 4(a), the A/D clock signal applied to shift register 40 by clock-doubler 42 is shown for reference. FIG. 4(b) illustrates the shifted A/D clock for a current sampling instant. An ADVANCE pulse applied to the counter 36 will cause its output to go down and consequently will advance the shifted A/D clock, as indicated in FIG. 4(c) by 81 nanoseconds, the equivalent of one baud period of the System clock. Conversely, a RETARD pulse applied to the counter 36 will retard the shifted A/D clock by 81 nanoseconds as illustrated in FIG. 4(d). Hence the frequency of the System clock, 12.288 MHz., determines the resolution of the timing recovery system. The system clock of 12.288 MHz. is also applied to the transmitter 50, which is not shown in detail, to control the transmission of data.

The spacing between the two samples S1 and S2, namely ⅛th of a baud, is determined with reference to the bandwidth of the low pass filter 24, the jitter specification laid down for an ISDN terminal, and the degree of overlap that is possible between the earliest pulse to be received, i.e. from the nearest terminal, and the latest pulse to be received, i.e. from the furthest terminal on the line that is sending signals to the receiver. In the specific embodiment, for a Short Passive Bus configuration, a jitter allowance of 365 nanoseconds (7 percent of 5.2 microseconds) reduces the spacing between S1 and S2 to ⅛th of a baud. Sample S1, which is the sample used for data extraction, then occurs substantially in the centre of the overlap and has been found to be a stable reference.

In effect, the two samples, S1 and S2, are used to determine the slope at the trailing corner of the framing pulse.

The specific embodiment described above, using a second sample which is 80 percent of the first sample, is particularly suitable for short passive loops. For extended passive and point-to-point configurations, a narrower bandwidth is appropriate, i.e. the slope of the trailing edge will be flatter. For such applications, satisfactory results may be obtained using a low pass filter 10 having a bandwidth of 150 KHz., with the second sample about 35 percent of the first sample and spaced therefrom by about one quarter of a baud. It is envisaged that a bandwidth for low pass filter 10 in the range 100 KHz to 500 KHz, with pulse ratios in the ranges 10 to 90% and spaced one half to one sixteenth of a baud period will provide satisfactory performance for most ISDN applications.

Various modifications and alternatives are possible without departing from the scope of the invention as defined by the claims appended hereto. For example, it might be possible to use a different bit instead of the framing bit, though it should be noted that some bits, for example the B1, B2 and D bits of an ISDN signal, are not always transmitted. It is envisaged that the leading corner of the framing bit might be used as a reference instead of the trailing corner. An advantage of using the framing bit to determine the timing is that it is always transmitted. This does not preclude, however, the use of other bits instead of the framing bit.

An advantage of embodiments of the invention over timing recovery using a zero-crossing as a reference is that, since the zero-crossing occurs later than the onset of the transition, i.e. after the "corner", it can be considered to be a less fundamental reference. Indeed, it has been found that the zero crossing following the framing bit of an ISDN signal can vary temporally relative to the "corner", i.e. the commencement of the transition, due to the previously stated consequences of multiple terminal systems, whereas the "corner" is much more stable i.e. less susceptible to variation due to multiple terminal effects.

Known timing recovery would usually need two modes of timing recovery, fixed and adaptive, in order to accommodate all ISDN S/T loop configurations whereas embodiments of the present invention can handle them with only the one, adaptive, timing recovery circuit.

A further advantage of embodiments of the present invention is that parts can be readily implemented using a digital signal processor. In particular, the frame detector 18, phase detector 16, loop filter 20 and phase shift controller 22 could be implemented using a DSP such as a TMS 320 C25 by Texas Instruments. The A/D converter 12 might also be implemented in a DSP if a custom design were used.

What is claimed is:

1. Apparatus for receiving a digital signal comprising timing recovery means for controlling sampling of said digital signal, said timing recovery means comprising means (12) for sampling said digital signal in response to a clock signal, means (16) for detecting within a baud period a rate of change of a portion of the sampled digital signal and providing a phase error signal in dependence upon the difference between said rate of change and a reference, and means (24) responsive to said phase error signal for controlling said clock signal to determine the timing of said sampling of said digital signal.

2. Apparatus as claimed in claim 1, wherein said means for sampling (12) samples said digital signal twice in each baud period to provide in each baud period a pair of samples spaced apart by a predetermined time interval defining said portion, and said means for detecting (16) determines said timing in dependence upon whether or not the amplitude of a first of said pair of samples is a predetermined fraction of the other of said pair of samples.

3. Apparatus for receiving a digital signal comprising timing recovery means for controlling sampling of said digital signal, said timing recovery means comprising means (12) for sampling said digital signal in response to a clock signal, means (16) for detecting in a baud period a rate of change of the sampled digital signal and providing a phase error signal in dependence upon the difference between said rate of change and a reference, and means (24) responsive to said phase error signal for controlling said clock signal to determine the timing of said sampling of said digital signal, wherein said means for sampling (12) samples said digital signal twice in each baud period to provide in each baud period a pair of samples spaced apart by a predetermined time interval, and said means for detecting (16) determines said timing in dependence upon whether or not the amplitude of a first of said pair of samples is a predetermined fraction of the other of said pair of samples, said means for detecting (16) including means (26;28;30;32) for computing the difference in amplitude between said pair of samples in every baud, frame detection means (14) responsive to a framing bit in said digital data signal for providing an enabling signal, and means (34) responsive to said means for computing (26;28;30;32) and to said enabling signal for providing a phase error signal once in each frame period.

4. Apparatus for receiving a digital signal comprising timing recovery means for controlling sampling of said digital signal, said timing recovery means comprising means (12) for sampling said digital signal in response to a clock signal, means (16) for detecting in a baud period a rate of change of the sampled digital signal and providing a phase error signal in dependence upon the difference between said rate of change and a reference, and means (24) responsive to said phase error signal for controlling said clock signal to determine the timing of said sampling of said digital signal, wherein said means for sampling (12) samples said digital signal twice in each baud period to provide in each baud period a pair of samples spaced apart by a predetermined time interval, and said means for detecting (16) determines said timing in dependence upon whether or not the amplitude of a first of said pair of samples is a predetermined fraction of the other of said pair of samples, said other of said samples in said pair of samples serving for data extraction.

5. Apparatus as claimed in claim 3, wherein said other of said samples in each pair of samples serves for data extraction.

6. Apparatus for receiving a digital signal comprising timing recovery means for controlling sampling of said digital signal, said timing recovery means comprising means (12) for sampling said digital signal in response to a clock signal, means (16) for detecting in a baud period a rate of change of the sampled digital signal and providing a phase error signal in dependence upon the difference between said rate of change and a reference, and means (24) responsive to said phase error signal for controlling said clock signal to determine the timing of said sampling of said digital signal, wherein said means for sampling (12) samples said digital signal twice in each baud period to provide in each baud period a pair of samples spaced apart by a predetermined time interval, and said means for detecting (16) determines said timing in dependence upon whether or not the amplitude of a first of said pair of samples is a predetermined fraction of the other of said pair of samples, said apparatus further comprising means (22) for determining the sign of the difference between said pair of samples and providing an advance signal and a retard signal, alternatively, in dependence upon such sign, and controlling means (24) responsive to said advance signal and said retard signal, selectively, to vary the phase of said clock signal.

7. Apparatus as claimed in claim 6, wherein said controlling means (24) for controlling said clock signal comprises means (42;44;46;48) for providing a second clock signal at the same frequency as the first clock signal, said second clock signal comprising two clock pulses in each baud separated by a predetermined time interval, and means (36;38;40) responsive to said second clock signal and to said advance and retard signals to provide the first clock signal, such that said means for sampling samples said digital data signal at two instants in each baud corresponding to said two clock pulses.

8. Apparatus as claimed in claim 2, wherein said pair of samples differ in amplitude by between 10 and 90 per cent of the greater of said samples.

9. Apparatus for receiving a digital signal comprising timing recovery means for controlling sampling of said digital signal, said timing recovery means comprising means (12) for sampling said digital signal in response to a clock signal, means (16) for detecting in a baud period a rate of change of the sampled digital signal and providing a phase error signal in dependence upon the difference between said rate of change and a reference, and means (24) responsive to said phase error signal for controlling said clock signal to determine the timing of said sampling of said digital signal, wherein said means for sampling (12) samples said digital signal twice in each baud period to provide in each baud period a pair of samples spaced apart by a predetermined time interval, and said means for detecting (16) determines said timing in dependence upon whether or not the amplitude of a first of said pair of samples is a predetermined fraction of the other of said pair of sample, wherein the bandwidth of said received signal is about 300 kilohertz, and said pair of samples differ in amplitude by about 20 per cent of the greater of said samples and are spaced apart by one eighth of a baud period.

10. Apparatus as claimed in claim 8, wherein the bandwidth of said received signal is about 150 kilohertz and said pair of samples differ by about 35 per cent and are spaced apart by about one quarter of a baud period.

11. Apparatus as claimed in any one of claims 1 through 10, wherein said timing recovery means serves to determine said rate of change for a part of said digital signal corresponding to the trailing corner of a framing bit of said digital signal.

12. A method of recovering timing in apparatus for receiving a digital signal comprising the steps of:
sampling each baud of said digital signal in response to a clock signal;
detecting the rate of change of a portion of the sampled digital signal and providing a phase error signal in dependence upon the difference between said rate of change and a reference; and
in response to said phase error signal, controlling said clock signal to determine the timing of said sampling of said digital signal.

13. A method as claimed in claim 12, wherein said sampling step samples said digital signal twice in each baud period to provide in each baud period a pair of samples spaced apart by a predetermined time interval defining said portion, and said detecting includes the step of determining whether or not a first of said pair of samples is a predetermined fraction of the other of said pair of samples.

14. A method of recovering timing in apparatus for receiving a digital signal comprising the steps of:
sampling each baud of said digital signal in response to a clock signal;
detecting the rate of change of the sampled digital signal and providing a phase error signal in dependence upon the difference between said rate of change and a reference; and
in response to said phase error signal, controlling said clock signal to determine the timing of said sampling of said digital signal;
said sampling step including sampling said digital signal twice in each baud period to provide in each baud period a pair of samples spaced apart by a predetermined time interval, and said detecting including the step of determining whether or not a first of said pair of samples is a predetermined fraction of the other of said pair of samples, said controlling including the steps of computing the difference in amplitude between a pair of said pulses in every baud, providing an enabling signal in response to a framing bit in said digital signal, and providing a phase error signal once in each baud period in response to said difference and to said enabling signal.

15. A method of recovering timing in apparatus for receiving a digital signal comprising the steps of:
sampling each baud of said digital signal in response to a clock signal;
detecting the rate of change of the sampled digital signal and providing a phase error signal in dependence upon the difference between said rate of change and a reference; and
in response to said phase error signal, controlling said clock signal to determine the timing of said sampling of said digital signal;
said sampling step including sampling said digital signal twice in each baud period to provide in each baud period a pair of samples spaced apart by a predetermined time interval, and said detecting including the step of determining whether or not a first of said pair of samples is a predetermined fraction of the other of said pair of samples, wherein said other of said samples in each pair of samples serves for data extraction.

16. A method as claimed in claim 14, wherein said other of said samples in each pair of samples serves for data extraction.

17. A method of recovering timing in apparatus for receiving a digital signal comprising the steps of:
sampling each baud of said digital signal in response to a clock signal;
detecting the rate of change of the sampled digital signal and providing a phase error signal in dependence upon the difference between said rate of change and a reference; and
in response to said phase error signal, controlling said clock signal to determine the timing of said sampling of said digital signal;
said sampling step including sampling said digital signal twice in each baud period to provide in each baud period a pair of samples spaced apart by a predetermined time interval, and said detecting including the step of determining whether or not a first of said pair of samples is a predetermined fraction of the other of said pair of samples, wherein said detecting includes the step of determining the sign of the difference between said pair of samples, and said step of controlling said sampling includes providing, selectively, an advance signal and a retard signal in dependence upon such sign, and varying the phase of said clock signal in response to said advance signal and said retard signal.

18. A method as claimed in claim 16, wherein said step of controlling comprises the steps of providing a second clock signal at the same frequency as the first-mentioned clock signal, said second clock signal comprising two clock pulses in each baud separated by a predetermined time interval, and providing the first clock signal in response to said second clock signal and said phase error signal, such that said digital signal is sampled at two instants in each baud corresponding to said two clock pulses.

19. A method as claimed in claim 13, wherein said pair of samples differ in amplitude by between 10 and 90 per cent of the greater of said samples.

20. A method of recovering timing in apparatus for receiving a digital signal comprising the steps of:
sampling each baud of said digital signal in response to a clock signal;
detecting the rate of change of the sampled digital signal and providing a phase error signal in dependence upon the difference between said rate of change and a reference; and
in response to said phase error signal, controlling said clock signal to determine the timing of said sampling of said digital signal;
said sampling step including sampling said digital signal twice in each baud period to provide in each baud period a pair of samples spaced apart by a predetermined time interval, and said detecting including the step of determining whether or not a first of said pair of samples is a predetermined fraction of the other of said pair of samples, wherein the bandwidth of said received signal is about 300 kilohertz, and said pair of samples differ in amplitude by about 20 per cent of the greater of said samples and are spaced apart by one eighth of a baud period.

21. A method as claimed in claim 19, wherein the bandwidth of said received signal is about 150 kilohertz and said pair of samples differ by about 35 per cent and are spaced apart by about one quarter of a baud period.

22. A method as claimed in any one of claims 12 through 21, wherein said rate of change is determined for a part of said digital signal corresponding to the trailing corner of a framing bit of said digital signal.

* * * * *